R. M. HUGHES.
LIQUID MEASURING AND DISPENSING APPARATUS.
APPLICATION FILED APR. 17, 1912.

1,053,816.

Patented Feb. 18, 1913.

3 SHEETS—SHEET 1.

Inventor,
Russel M. Hughes.
By Victor J. Evans,
Attorney.

Witnesses:
Christ Feinle, Jr.
C. C. Hines.

R. M. HUGHES.
LIQUID MEASURING AND DISPENSING APPARATUS.
APPLICATION FILED APR. 17, 1912.
1,053,816.
Patented Feb. 18, 1913.
3 SHEETS—SHEET 2.
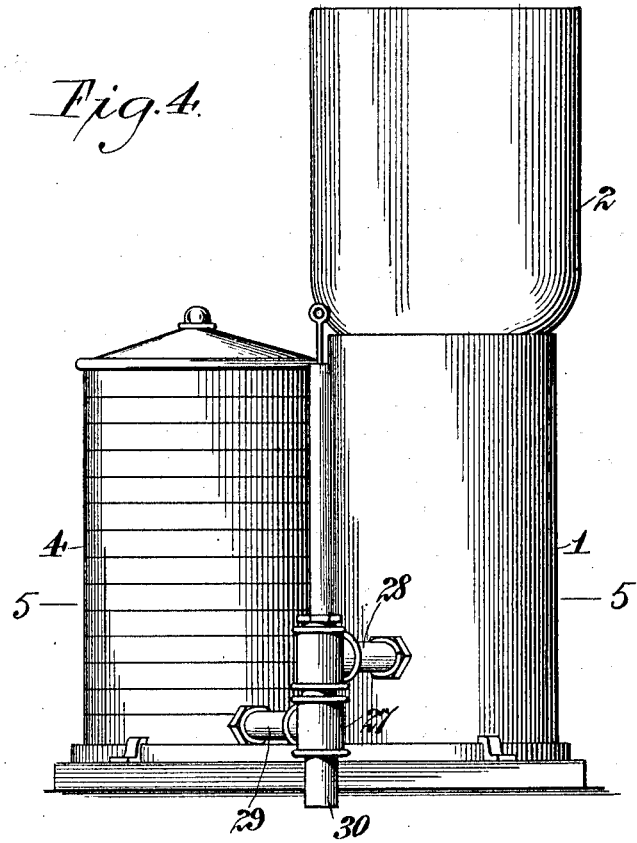
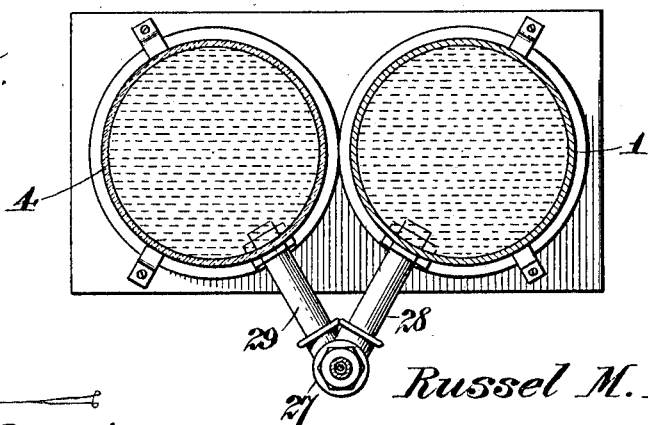

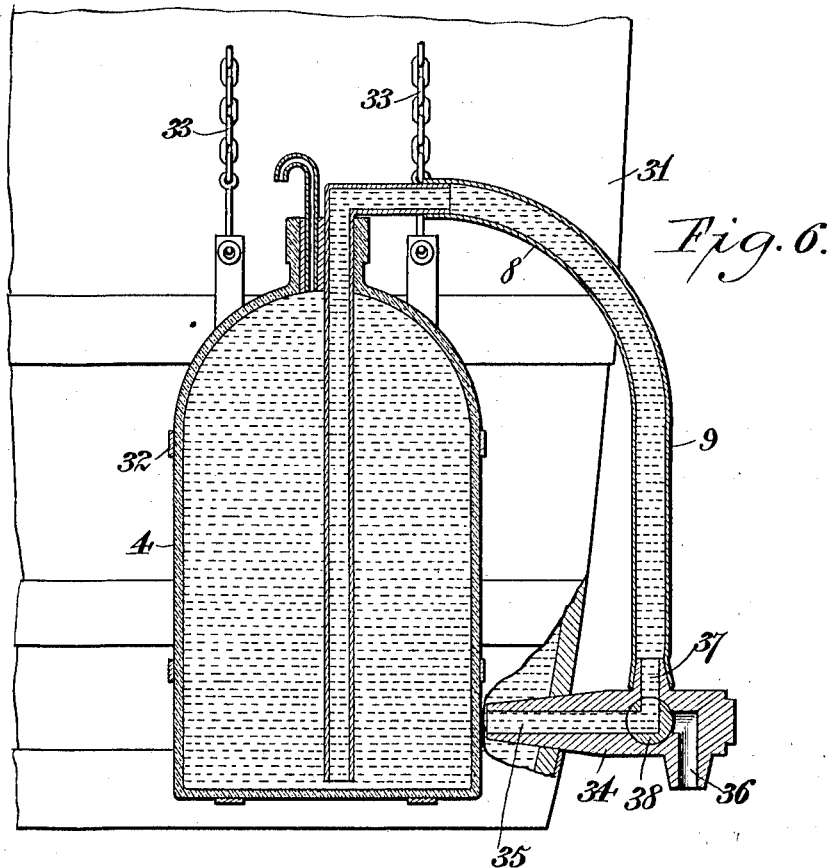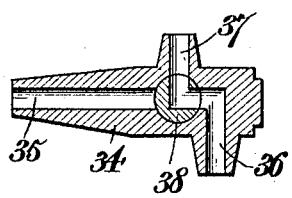

UNITED STATES PATENT OFFICE.

RUSSEL M. HUGHES, OF LOUISVILLE, KENTUCKY, ASSIGNOR TO R. M. HUGHES CO., INC., OF LOUISVILLE, KENTUCKY, A CORPORATION OF NEW JERSEY.

LIQUID MEASURING AND DISPENSING APPARATUS.

1,053,816.      Specification of Letters Patent.      Patented Feb. 18, 1913.

Application filed April 17, 1912. Serial No. 691,334.

*To all whom it may concern:*

Be it known that I, RUSSEL M. HUGHES, a citizen of the United States, residing at Louisville, in the county of Jefferson and State of Kentucky, have invented new and useful Improvements in Liquid Measuring and Dispensing Apparatus, of which the following is a specification.

This invention relates to a liquid measuring and dispensing apparatus, particularly designed for the use of merchants and others for dispensing measured quantities of liquid from a primary container.

The object of the invention is to provide a simple, reliable and efficient construction of apparatus of this character whereby the liquid from the primary container may be supplied to and maintained at a determined level in a primary receptacle, and supplied therefrom to a measuring vessel from which measured quantities of the liquid may be dispensed, said measuring vessel being automatically replenished upon the discharge of a portion of liquid therefrom.

A further object of the invention is to provide an apparatus of this character having novel valve mechanism for controlling the flow of the liquid from the primary receptacle to the measuring vessel, and from the latter to a discharge outlet.

The invention consists of the features of construction, combination and arrangement of parts, hereinafter fully described and claimed, reference being had to the accompanying drawings, in which:—

Figure 1:
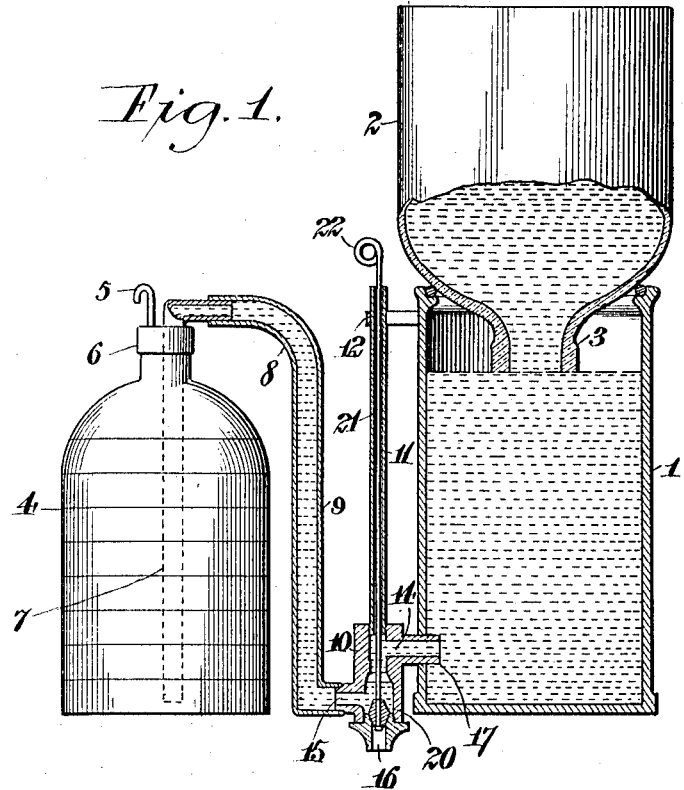
Figure 2:
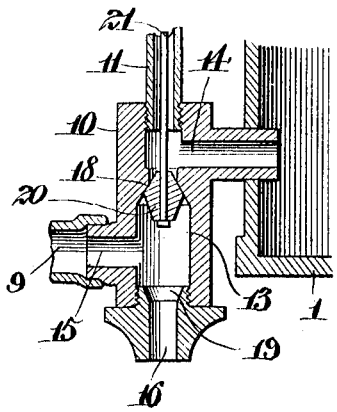
Figure 3:
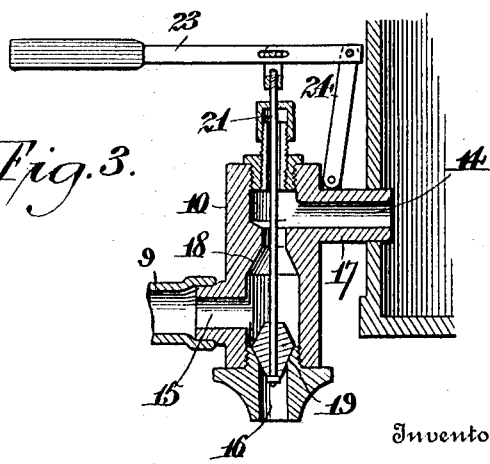

Figure 1 is a sectional elevation through a liquid measuring and dispensing apparatus embodying my invention, showing the primary receptacle and measuring vessel in normal communication. Fig. 2 is a detail view of the controlling valve in position to cut off the feed of the liquid from the primary receptacle and the discharge of the liquid from the measuring vessel. Fig. 3 is a detail view showing a modified form of valve operating stem. Fig. 4 is a view showing a modified construction of valve and arrangement of passages. Fig. 5 is a horizontal section on the line 5—5 of Fig. 4.
Fig. 6 is a vertical section of still another modified form of measuring and dispensing apparatus, showing the valve in position to normally control communication between the primary receptacle and measuring vessel. Fig. 7 is a detail section through the valve showing the same in position for closing communication between the primary receptacle and measuring vessel and opening communication between the measuring vessel and outlet.

Referring to Figs. 1 and 2 of the drawings, which show an apparatus especially designed for counter use, 1 designates a primary liquid containing receptacle which is open at its upper end for communication with the primary container or storage vessel 2, which latter may be, as shown, in the form of an inverted bottle having its mouth 3 projecting into the top of said receptacle. The liquid from the container 2 discharges therefrom into the receptacle 1 and fills the latter up to a level determined by the extent of projection of the mouth 3 of the container into the receptacle. When the liquid in the receptacle reaches the level of the mouth 3, the latter is sealed and the outflow of liquid from the container cut off, as will be readily understood, the receptacle being automatically replenished when the liquid falls below said prescribed level in an obvious manner.

Arranged alongside the receptacle 1 is a graduated glass or other transparent measuring and dispensing vessel 14 provided at its top with a suitable air inlet 5, which may consist of an ordinary glass tube extending through a stopper 6. Also extending through said stopper down into said vessel 4 to a point near the bottom of the vessel is one of the legs 7 of a siphon tube 8, the other leg 9 of which is coupled to a valve casing 10 from which extends a guide tube 11 arranged alongside the vessel 1 and supported therefrom by the valve casing 10 and one or more brackets 12. The vessel 4 is initially filled from the container 2 which is being used as the storage vessel at that time, after which the leg 7 of the siphon tube is fitted therein, thus priming said measuring vessel for operation.

The valve casing 10 is provided with a vertical passage 13 provided at its upper and lower ends with lateral ports 14 and 15 and at its lower end with a discharge port or outlet 16. The port 14 communicates through a connecting pipe or tube 17 with the vessel 1, while the port 15, which is arranged at the diametrically opposite side of the casing from said port 14, communicates with the lower end of the siphon leg

9. The port or discharge outlet 16 is arranged below the lower lateral port 15, and between the ports 14 and 15 is arranged a valve seat 18 and between the lower end of the passage and outlet 16 is arranged a valve seat 19.

A duplex controlling valve 20 is movable in the passage 13 between the valve seats 18 and 19, the lower end of said valve being adapted for engagement with the seat 19 and the upper end of said valve being adapted for engagement with the seat 18. When the valve is in engagement with the seat 19, free communication between the receptacle 1 and vessel 4 through the siphon tube 8 is afforded, while when the valve is in engagement with the seat 18 flow of liquid from the receptacle 1 is cut off and communication between the vessel 4 and discharge outlet 16 established through the siphon tube 8 for the automatic discharge of liquid from said vessel. A rod or stem 21 is attached to the lower end of the valve and projects upwardly through the tube 11 and is provided at its upper end with a finger piece 22 whereby said rod and valve may be adjusted. If desired, the upper end of the rod 21 may be pivotally connected with the operating lever 23 coupled by a link 24 to the valve casing or some other suitable support.

In priming the apparatus for operation, the primary container 2 is arranged in position for the discharge of the liquid therefrom into the receptacle 1, and the valve 20 is adjusted to the position shown in Fig. 1, whereby the liquid will flow into and fill the arm 9 of the siphon up to the level of the liquid in the receptacle 1. A vacuum is then formed in the inlet leg 7 of the siphon in any preferred manner to start the flow of liquid therethrough, after which such leg of the siphon is inserted into the measuring vessel 4, the liquid continuing to flow until said vessel is filled, as will be readily understood. The liquid will flow from the container 2 to the receptacle 1 when the liquid in the latter falls below the level of the mouth 3 while the measuring vessel is being filled, but as soon as the measuring vessel is filled and the liquid in the receptacle 1 reaches the level of the mouth 3 the latter will be sealed, whereupon the apparatus will be in condition for use. If, therefore, with the apparatus primed as described, the valve 20 is lifted to engage the seat 18, communication between the receptacle 1 and lower portion of the valve casing will be cut off, and communication established between the discharge outlet and siphon tube, for the automatic discharge or siphoning off of the liquid from the measuring or dispensing vessel 4.

It will be understood, of course, that by holding the valve open for variable periods, the entire amount of the liquid contained in the vessel 4 or any fractional portion thereof may be dispensed. A construction of dispensing apparatus is thus provided which is particularly adapted for counter use, but may be employed in other situations in a store or establishment to keep the liquid in a sanitary condition and enable it to be dispensed in measured quantities in a ready, simple, convenient and time-saving manner.

In Figs. 4 and 5 I have shown another form of my invention adapted also for counter use and in which a siphon tube is dispensed with. In this construction the valve casing 27 is in communication at its upper and lower ends through lateral pipes or passages 28 and 29 with the primary receptacle 1 and bottom of the measuring vessel 4, so that when the valve is adjusted to cut off the flow of liquid from the primary receptacle the outlet 30 will be opened for the direct discharge of the liquid by gravity from the vessel 4.

In Figs. 6 and 7 I have illustrated a further modified form of my invention particularly designed for dispensing liquid from a barrel, cask or similar primary receptacle. In this construction the measuring vessel 4 is disposed upon the outside of the cask or primary receptacle 31 and is preferably fitted within a holder or basket 32 which is attached to link chains 33 adapted to be engaged with hooks (not shown) or other suitable supports on said receptacle 31, whereby the vessel 4 may be adjusted upwardly or downwardly to follow the level of the liquid in the receptacle. With this construction the siphon tube before described is employed, the outer leg 9 of said tube being connected with a valve casing 34 communicating with the interior of the receptacle. As shown, said valve casing 34 is provided with a passage having an inlet portion 35, and an outlet or discharge portion 36, with which passage, at a point between said inlet and discharge portions, communicates a vertical or intersecting passage 37 connected with the siphon leg 9. A two-way valve 38 is disposed in the passage and is adjustable to the position shown in Fig. 6 to afford communication between the primary receptacle and measuring vessel through the siphon tube, and adjustable to the position shown in Fig. 7 to cut off communication between the primary receptacle and measuring vessel and open communication between said measuring vessel and the discharge outlet 36. It will be understood that when the valve is arranged in the position shown in Fig. 6, the liquid will siphon from the primary receptacle to the measuring vessel until the liquid therein is at a common level, and that by adjusting the valve to the position shown in Fig. 7 all or any fractional portion of the liquid contained in the measuring vessel may be discharged.

Having thus described the invention, what I claim as new is:—

1. A device of the character described comprising a receptacle, a separate and independent measuring vessel arranged upon the exterior of said receptacle, a valve casing having upper and lower lateral passages communicating respectively with the receptacle and vessel and a vertical passage terminating below said lower lateral passage in a discharge outlet, a tube or pipe connecting the lower lateral passage with the vessel, and a valve movable in said vertical passage to control communication between the upper and lower lateral passages or between said lower lateral passage and the discharge outlet.

2. A device of the character described comprising a receptacle, a separate and independent measuring vessel arranged upon the exterior of said receptacle, a valve casing having a discharge outlet and a pair of ports, one of said ports communicating with said receptacle, a siphon tube connecting the other port of the valve casing with the measuring vessel, and a valve movable in said casing to one position to close the discharge outlet and open communication between the receptacle and siphon tube, and movable to a second position to close the port communicating with the receptacle, and to open communication between the siphon tube and discharge outlet.

3. A device of the character described comprising a receptacle, a measuring vessel, a valve casing provided with a vertical passage having a lateral outlet communicating with the receptacle, a second lateral outlet below the first-named lateral outlet and a discharge passage below the second-named lateral outlet, a siphon tube connecting said second-named lateral outlet with the vessel, and a valve in said casing movable downwardly to close the discharge outlet and open communication between the lateral outlets and movable upwardly to close the upper lateral outlet and open communication between the lower lateral outlet and the discharge outlet.

In testimony whereof I affix my signature in presence of two witnesses.

RUSSEL M. HUGHES.

Witnesses:
T. J. HARR,
CHAS. ZIEGLER.

Copies of this patent may be obtained for five cents each, by addressing the "Commissioner of Patents, Washington, D. C."